July 27, 1965
G. E. DAILEY
3,197,748
MAGNETIC FIELD SENSING APPARATUS
Filed Dec. 30, 1960
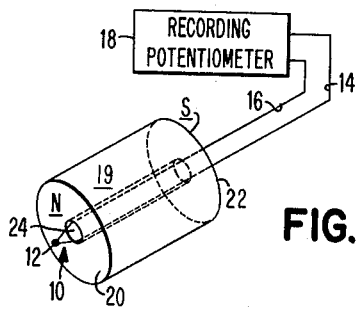
FIG. 1
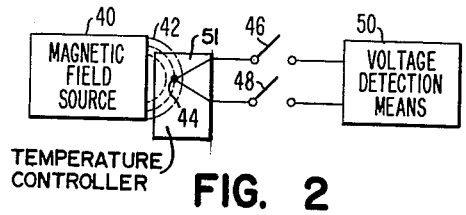
FIG. 2
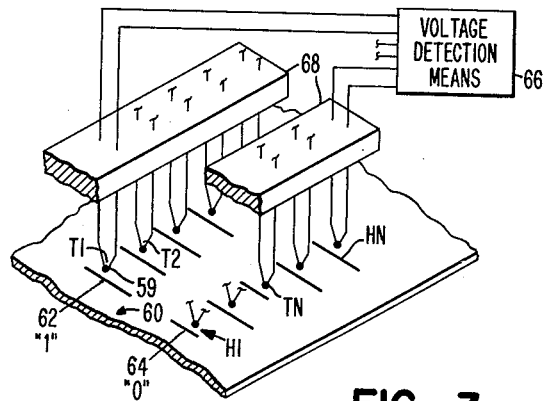
FIG. 3
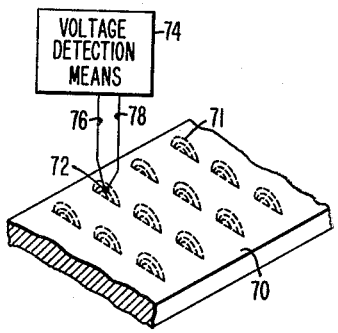
FIG. 4
FIG. 5
FIG. 6
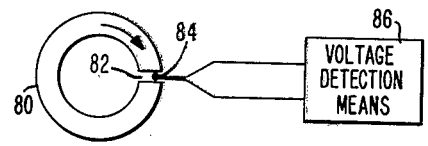
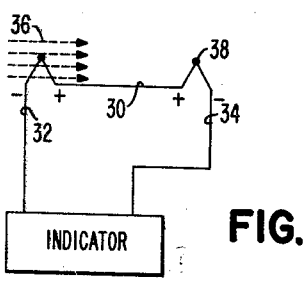
FIG. 7
INVENTOR.
GEORGE E. DAILEY
BY Bernard N. Wiener
ATTORNEY

United States Patent Office 3,197,748
Patented July 27, 1965

3,197,748
MAGNETIC FIELD SENSING APPARATUS
George E. Dailey, Newark Valley, N.Y., assignor to International Business Machines Corporation, New York, N.Y., a corporation of New York
Filed Dec. 30, 1960, Ser. No. 79,724
15 Claims. (Cl. 340—174)

This invention relates to magnetic field sensing apparatus and more particularly to magnetic field sensing apparatus in which the sensor responds to the presence of the magnetic field.

Broadly, a sensor for a magnetic field may be one which responds to the relative change of the magnetic field or it may be one which responds to the presence of the magnetic field. I have discovered that a thermocouple junction provides an altered voltage output solely because of the presence of magnetic field flux therein. My invention involves utilization of my discovery in preferred embodiments and techniques. The art of thermocouple construction and measurement of the voltage thereof is well established. Thermocouples used in the practice of my invention and the measurement of the voltages thereof are conventional. An illustrative text suitable to provide background for these aspects of my invention is Temperature Measurement in Engineering, by H. D. Baker et al., published by John Wiley & Sons, Inc., 1953. Illustrative articles of interest relative to thermocouples are "Construction of Radiation Thermocouples Using Semi-Conducting Thermoelectric Materials," by D. A. H. Brown et al., Journal of Scientific Instruments, vol. 30, June 1953, pp. 195–199, and "Methods of Testing Thermocouples and Thermocouple Materials," by W. F. Roeser et al., Circular National Bureau of Standards, No. 590, 1958, p. 21.

As a thermocouple junction can be made extremely small, it is possible to sense a magnetic flux pattern with great definition through the practice of my invention. As a thermocouple junction can be readily adapted to have various configurations, my invention makes it possible to detect magnetic fields in locations difficult to sense by conventional techniques.

It is a prime object of my invention to provide magnetic field sensing apparatus capable of sensing a magnetic field pattern with great definition.

It is another object of my invention to provide magnetic field sensing apparatus capable of detecting a magnetic field in a remote location.

It is still another object of my invention to provide magnetic field sensing apparatus in which the sensor is a thermocouple junction.

The foregoing and other objects, features and advantages of the invention will be apparent from the following more particular description of preferred embodiments of the invention, as illustrated in the accompanying drawings.

In the drawings:

FIGURE 1 illustrates the nature of experiments through which I discovered that a thermocouple junction provides an altered voltage solely through the presence of a magnetic field therein.

FIGURE 2 illustrates the practice of my invention through presentation of a thermocouple junction located in the magnetic field from a magnetic field source and voltage detecting means for the thermocouple connected thereto.

FIGURE 3 illustrates the practice of my invention for retrieval of stored binary information from a magnetizable surface through use of a plurality of thermocouple junctions proximate the surface and appropriate voltage indicating means for the thermocouples.

FIGURE 4 illustrates the practice of my invention for detecting a magnetic field which changes relative to a thermocouple junction therein.

FIGURE 5 illustrates the practice of my invention for sensing the state of a magnetic core by establishing a thermocouple junction in a gap in the core.

FIGURE 6 illustrates the practice of my invention for detecting current flow by a thermocouple junction within the magnetic field generated by the current.

FIGURE 7 illustrates the practice of my invention with temperature compensation by use of opposing thermocouple junctions.

This invention provides magnetic field sensing apparatus which includes a thermocouple junction in the magnetic field and a voltage change resultant solely from the presence of the magnetic field in the junction. Through the practice of this invention, binary information stored as a magnetic field is retrieved by a thermocouple junction which responds to magnetic field. The junction is placed within the field which carries the binary information and the voltage change resultant solely from the presence of the magnetic field in the junction is detected.

FIGURE 1 illustrates the experiments whereby I made the discovery that a thermocouple provides an altered voltage solely through the presence of a magnetic field in the junction thereof. A conventional iron-constantan thermocouple 10 having a welded junction 12 is shown with its conductor terminals 14 and 16 connected to a conventional recording potentiometer 18. A small permanent magnet 19 having a north pole at end 20 and a south pole at end 22 is disposed with end 20 proximate junction 12. Permanent magnet 19 has a small cylindrical orifice 24 extending from end 20 to end 22 large enough to permit the conductors of thermocouple 10 and junction 12 to pass therethrough. When an end of magnet 19 was brought proximate the junction 12, the potentiometer 18 showed an increased voltage reading. It was determined that the sign of the reading was the same regardless of the direction of the magnetic field. This was determined by bringing alternately ends 20 and 22 proximate junction 12. The sign independence was clearly demonstrated by passing the junction 12 through orifice 24 so that junction 12 was at various distances from the closest end of magnet 19. The reading of potentiometer 18 was greater with lesser distance of the junction 12 from the closest end of magnet 19. When the ends of the magnet 19 were interchanged with respect to junction 12, the same circumstance occurred. The maximum change obtained for the iron-constantan welded thermocouple was 160 microvolts.

A similar experiment was performed with an iron-constantan thermocouple junction which was prepared by electro-plating iron on an iron thermocouple wire adjacent to a constantan thermocouple wire.

The results of this experiment were identical to those obtained with the welded iron-constantan junction. Iron, nickel-alloy, copper and constantan thermocouple wires were made into junctions in all possible combinations. With a copper-constantan junction a maximum change of 50 microvolts was observed. With both the copper-nickel junction and the iron-nickel junction the maximum voltage change observed was approximately 20 microvolts. With the iron-copper and nickel-constantan junctions it was not possible to discern a voltage change. I speculate that every thermocouple junction will provide an altered voltage with the presence of a magnetic field therein. For a given intensity of the magnetic field it appears that the voltage change can be related to the Seebeck potential for the junction. However, for the practice of my invention, I specify a thermocouple junction which does have an altered voltage with the presence of a magnetic field therein. A thermocouple junction suitable for practice of my invention is readily determined by placing the thermocouple junction in a magnetic field of known intensity and connecting its terminals to a sensitive voltage detector. The particular thermocouple is then calibrated in terms of voltage output against magnetic field intensity. The construction of the thermocouple is such no net voltage is induced in the conductors thereof. One way to achieve this is to twist the conductors.

The nature of my invention will be understood through reference to FIG. 2. A magnetic field source 40 provides a magnetic field 42. A thermocouple junction 44 suitable for the practice of this invention, according to the principles aforesaid, is placed within the magnetic field. Thermocouple wires 46 and 48 are connected to thermocouple voltage detection means 50. A conventional temperature controller for the environment of the thermocouple junction 44 is indicated by block 51. The temperature controller 51 maintains the temperature of thermocouple junction 44 constant. Any change in the magnetic field intensity of magnetic field 42 from magnetic field source 40 is discerned by voltage detection means 50. Thermocouple junction 44 responds to the presence and intensity of magnetic field 42.

FIGURE 3 illustrates the practice of my invention for the retrieval of binary information stored in a magnetizable surface which manifests the magnetization by an external magnetic field. Such a surface may be a conventional magnetic drum, a conventional magnetic tape, or a plurality of permanently magnetizable structures which establish the surface, e.g. bar magnets. A thermocouple junction 59 which is responsive to both the presence and the intensity of a magnetic field in accordance with this invention is placed proximate the surface 60. A magnetic field 62 is shown within junction 59. Illustratively, a binary bit "1" is represented by a magnetic field 62 having a unit intensity and a binary bit "0" is represented as a magnetic field 64 having ½ unit intensity.

For each bit of magnetic stored binary information H1 ... H$n$ there is provided a thermocouple T1 ... T$n$. For each thermocouple T1 ... T$n$, there is a voltage detection means 66. Voltage detection means 66 may be a plurality of detection means or it may be one means which is switched for reviewing the altered voltage of thermocouples T1 ... T$n$. Thermocouples T1 ... T$n$ are shown held rigidly with respect to surface 60 by mounting frame 68.

FIGURE 4 illustrates the practice of my invention for detecting a variable magnetic field and for retrieving stored binary information from a magnetizable surface which moves relative to a thermocouple junction. In FIG. 4 there is shown a magnetized surface 70 containing stored binary information in magnetic field patterns formed in accordance with the instructions characterized for FIG. 3. A thermocouple junction 72 is shown proximate magnetized surface 70 and voltage detection means 74 is connected to thermocouple leads 76 and 78 of thermocouple junction 72. Since junction 72 responds to the presence of a magnetic field, the motion of surface 70 relative thereto can be quite fast provided only that the speed is not so great as to prevent the magnetic field from penetrating the junction 72. Such a condition occurs when the speed is so great that eddy currents prevent the penetration.

FIGURE 5 illustrates the practice of my invention for retrieving information stored in a magnetic core having a substantially non-symmetrical hysteresis loop with respect to the driving ampere-turns axis. With such a loop, the remanent states will have different values of remanent magnetization. The core 80 has a narrow gap 82 therein. A thermocouple junction 84 in accordance with this invention is placed in gap 82 and the voltage therefrom as a result of the presence of the magnetic flux in gap 82 is detected by detection means 86.

FIGURE 6 illustrates the practice of my invention for discerning the presence of and magnitude of electric current flow in a conductor. There is shown a conductor 90 carrying an electric current. A thermocouple junction 92 in accordance with this invention is placed proximate the surface of conductor wire 90. Insulation 94 is shown between thermocouple junction 92 and the surface of conductor wire 90. Voltage detection means 96 is shown connected to thermocouple wires 98 and 100. Through practice of this embodiment of my invention the thickness of insulation on a current carrying conductor can be obtained. By noting the voltage change when the junction is a known distance from the surface, the thickness can be determined by extrapolation when the voltage is observed for the junction on the surface.

Since a thermocouple junction is temperature sensitive, it is necessary that any effect due to a change in temperature be compensated during the practice of my invention. This can be accomplished either by maintaining the environment of the thermocouple junction at a constant temperature or by nullifying the effect of temperature change by use of two thermocouples as presented in FIG. 7. Illustratively in FIG. 7 wire 30 is made of iron and wires 32 and 34 are made of constantan. Junction 36 is located in the magnetic field whose presence is to be discerned and junction 38 is located in the same temperature environment but shielded from the magnetic field to be discerned. Any change in temperature is cancelled by such an arrangement.

While the invention has been particularly shown and described with reference to preferred embodiments thereof, it will be understood by those skilled in the art that various changes in form and details may be made therein without departing from the spirit and scope of the invention.

What is claimed is:

1. Voltage indicating means including a thermocouple junction which provides an altered voltage output resultant solely from the presence of magnetic field therein and means for applying a magnetic field therein to vary the voltage output of said voltage indicating means.

2. Magnetic field detection means including a thermocouple junction, means for establishing said junction in the presence of a magnetic field to be detected so that said magnetic field is caused to exist in said junction, said thermocouple junction being one which provides an altered voltage output resultant solely from the presence of magnetic field therein, and voltage detection means responsive to the voltage output of said thermocouple junction whereby the altered voltage resultant from the presence of said magnetic field in said junction is detected by said voltage detection means.

3. A voltage source including means for providing a magnetic field, means for establishing a thermocouple junction in said magnetic field, said thermocouple junction being one which provides an altered voltage output resultant solely from the presence of magnetic field therein, and electric terminals connected to said thermocouple junction to furnish said altered voltage.

4. Apparatus including means for providing a magnetic field and a thermocouple junction in said magnetic field to provide a voltage resultant solely from the presence of said magnetic field in said junction and terminal means communicating electrically with said junction.

5. A voltage source including a first and a second thermocouple junction connected in opposition, means for establishing a magnetic field in said first junction only, said first junction being one which provides an altered voltage output resultant solely from the presence of magnetic field therein, and terminal means communicating with said junctions for providing said voltage.

6. A voltage source including a thermocouple junction which provides an altered voltage resultant solely from the presence of magnetic field therein, means for compensating the thermal voltage from said junction, means for establishing a magnetic field in said junction, and terminal means to furnish said voltage.

7. The voltage source of claim 6 in which said compensating means has an identical junction connected in opposition with said thermocouple junction and which is disposed outside of said field.

8. Magnetic field detection apparatus having a source of said magnetic field, means for maintaining the temperature constant in a region of said magnetic field, a thermocouple junction in said region which provides an altered voltage output resultant solely from the presence of magnetic field therein, and voltage detection means communicating with said thermocouple junction whereby said voltage detection means provides an indication of said magnetic field.

9. Apparatus for measuring magnetic field intensity, said apparatus including a source of said magnetic field, a thermocouple junction in a region of said magnetic field, said thermocouple junction being one which provides an altered voltage output resultant solely from the presence of magnetic field therein, means for compensating for the thermoelectric voltage of said junction and voltage detection means communicating with said junction whereby the voltage thereof provides a measure of said magnetic field intensity.

10. Apparatus for detecting binary information stored in a plurality of magnetic field patterns including means for providing said magnetic field patterns, a thermocouple junction in each of said patterns, said thermocouple junction being one which provides an altered voltage output resultant solely from the presence of magnetic field therein, and voltage detection means for providing an indication of the bit value of the stored binary information in each of said magnetic field patterns.

11. The apparatus in claim 10 in which said means for providing said magnetic field patterns is a magnetic surface.

12. Apparatus for detecting binary information stored in a plurality of magnetic field patterns including means for providing said patterns, means for establishing a thermocouple junction in each of said patterns in a sequential manner, said thermocouple junction being one which provides an altered voltage resultant solely from the presence of magnetic field therein, and voltage detection means for providing an indication of the bit value of the stored binary information in each of said magnetic field patterns.

13. Apparatus for detecting the presence of a variable magnetic field, said apparatus including a source of said magnetic field, a thermocouple junction in a region of said magnetic field, said thermocouple junction being one which provides an altered voltage output resultant solely from the presence of magnetic field therein, and voltage detection means communicating with said thermocouple junction to provide an indication of the presence of said magnetic field.

14. Apparatus for retrieving binary information stored in a magnetic core by different degrees of magnetization thereof including means for establishing a discontinuity in said core, a thermocouple junction in said discontinuity, said thermocouple junction being one which provides an altered voltage output resultant solely from the presence of magnetic field therein, and detection means communicating with said thermocouple junction whereby the altered voltage therefrom is detected to provide an indication of the binary state in said core.

15. Apparatus for ascertaining the strength of an electric current including means for providing said electric current, a thermocouple junction within the magnetic field provided by said electric current, said thermocouple junction being one which provides an altered voltage output resultant solely from the presence of magnetic field therein, and voltage detection means connected to said thermocouple junction to provide a measure of said electric current strength.

References Cited by the Examiner

UNITED STATES PATENTS

| | | | |
|---|---|---|---|
| 2,153,378 | 4/39 | Kramer | 324—117 |
| 2,065,302 | 7/52 | Specht | 324—117 |
| 2,673,326 | 3/54 | Stauffer | 324—32 |
| 2,776,406 | 1/57 | Cohn et al. | 324—58 X |
| 2,819,456 | 3/58 | Stuart-Williams | 340—174 |
| 2,840,801 | 6/58 | Beter et al. | 340—174 |

OTHER REFERENCES

Publication: The Review of Scientific Instruments, vol. 21, No. 1, January 1950, pp. 69, 70.

Textbook: Ferromagnetism, Bozorth, R. M., D. Van Nostrand Co., Inc., New York, 1951, p. 861 relied upon.

IRVING L. SRAGOW, *Primary Examiner.*